United States Patent
Evrard et al.

(10) Patent No.: US 9,285,292 B2
(45) Date of Patent: Mar. 15, 2016

(54) METHOD OF OPTIMIZING THE PERFORMANCE OF AN AIRCRAFT, A DEVICE, AND AN AIRCRAFT

(71) Applicant: AIRBUS HELICOPTERS, Marignane (FR)

(72) Inventors: Jean-Philippe Evrard, Marseilles (FR); Alban Corpron, Salon de Provence (FR)

(73) Assignee: AIRBUS HELICOPTERS, Marignane (FR)

( * ) Notice: Subject to any disclaimer, the term of this patent is extended or adjusted under 35 U.S.C. 154(b) by 937 days.

(21) Appl. No.: 13/738,305

(22) Filed: Jan. 10, 2013

(65) Prior Publication Data

US 2014/0200844 A1  Jul. 17, 2014

(30) Foreign Application Priority Data

Feb. 6, 2012 (FR) ..................................... 12 00340

(51) Int. Cl.
*G01M 15/14* (2006.01)
*F02C 9/00* (2006.01)
*B64C 27/04* (2006.01)

(52) U.S. Cl.
CPC ............... *G01M 15/14* (2013.01); *B64C 27/04* (2013.01); *F02C 9/00* (2013.01); *F05D 2220/329* (2013.01); *F05D 2260/80* (2013.01); *F05D 2260/821* (2013.01); *F05D 2270/303* (2013.01); *F05D 2270/304* (2013.01); *F05D 2270/332* (2013.01); *F05D 2270/335* (2013.01); *F05D 2270/803* (2013.01); *Y02T 50/671* (2013.01)

(58) Field of Classification Search
USPC ........................................................ 702/130
See application file for complete search history.

(56) References Cited

U.S. PATENT DOCUMENTS

| 7,487,029 | B2 | 2/2009 | Feeney et al. |
| 7,532,970 | B1 | 5/2009 | Lardillon |
| 7,769,521 | B2 | 8/2010 | Gaulmin |
| 8,068,997 | B2 | 11/2011 | Ling |
| 8,121,773 | B2 | 2/2012 | Gaulmin |
| 2007/0260391 | A1* | 11/2007 | Gaulmin .................... F02C 9/28 701/100 |
| 2008/0125931 | A1* | 5/2008 | Gaulmin .................... F02C 9/00 701/31.4 |
| 2010/0204931 | A1* | 8/2010 | Ling .................. G05B 23/0283 702/41 |

FOREIGN PATENT DOCUMENTS

| EP | 1741901 A1 | 1/2007 |
| FR | 2899640 A1 | 10/2007 |
| FR | 2902407 A1 | 12/2007 |

OTHER PUBLICATIONS

Search Report and Written Opinion; Application No. FR 1200340; dated Sep. 28, 2012.

* cited by examiner

*Primary Examiner* — Tung S Lau
(74) *Attorney, Agent, or Firm* — Brooks Kushman P.C.

(57) ABSTRACT

A method of optimizing the performance of a rotary wing aircraft having at least one turbine engine with a gas generator and a turbine assembly comprising at least one turbine. In a definition step (STP1), first and second performance levels are defined for the aircraft. During a health check step (STP2), a first power margin is determined as a function of a speed of rotation of said gas generator and a second power margin is determined as a function of a temperature in said turbine assembly. During an evaluation step (STP3), each power margin is compared with a first threshold in order to determine whether a target performance level is equal to the first performance level or to the second performance level. During a display step (STP4), the target performance level is displayed.

14 Claims, 1 Drawing Sheet

METHOD OF OPTIMIZING THE PERFORMANCE OF AN AIRCRAFT, A DEVICE, AND AN AIRCRAFT

CROSS REFERENCE TO RELATED APPLICATIONS

This application claims priority to French patent application No. FR 12 00340 filed on Feb. 6, 2012, the disclosure of which is incorporated in its entirety by reference herein.

BACKGROUND OF THE INVENTION (1) Field of the Invention

The present invention relates to a method of optimizing the performance of an aircraft, to a device, and to an aircraft.

The invention is thus situated in the technical field of power plants for vehicles, in particular for an aircraft, and more particularly for a rotorcraft.

(2) Description of Related Art

An aircraft is usually provided with at least one engine for propelling it. For example, a rotary wing aircraft has a power plant provided with at least one engine for driving a rotary wing in rotation. By way of example, a helicopter is often fitted with at least one turbine engine, specifically a turboshaft engine, and sometimes known as a gas turbine.

Each engine is dimensioned to be capable of being used at at least one power rating, each power rating associating a developed power level with a duration of utilization.

Among known ratings, mention may be made of the following:

the take-off rating which associates a maximum take-off power PMD with a duration of utilization of about 5 minutes (min) to 10 min; and the maximum continuous rating associating a maximum continuous power (PMC) with an unlimited utilization duration.

There also exist super-contingency ratings for aircraft having at least two engines, these ratings being for use when one of the engines fails:

a first contingency rating associates a super-contingency power with a duration of about thirty consecutive seconds known as 30 sec OEI (for one engine inoperative), this first contingency rating being usable on about three occasions during a flight;

a second contingency rating associating a maximum contingency power with a utilization duration of about two minutes, known as 2 min OEI; and a third contingency rating associating an intermediate contingency power with a utilization duration extending to the end of a flight after one engine has failed, for example.

In parallel, it is common to determine the number of hours of flight that an aircraft engine can endure before it needs to be revised. This number of flight hours is known as the time between overhauls (TBO).

The performance of an aircraft then depends on the power that can be developed by each engine in the various power ratings. For example, the maximum take-off weight of an aircraft and its cruising speed are aspects of performance that depend in particular on the power developed by each engine.

Nevertheless, the power developed by an engine tends to decrease over time. The power levels developed by a new engine are generally higher than the power levels developed by an aging engine that is coming up to its Time between overhauls.

Under such circumstances, in order to guarantee the required performance independently of the age of an aircraft engine, it is possible to overdimension the engines.

It can be understood that the performance of a new engine and the performance of an aging engine may differ. Consequently, new engines may be more powerful than the engines actually required and certified for guaranteeing the performance of the aircraft throughout its lifetime. Each new engine thus presents a power margin over the required power levels.

Typically, an engine may present a power margin lying in the range 2% to 10% over the required and certified power levels. Under such conditions, the performance of an aircraft is thus guaranteed throughout the lifetime of its engines.

Nevertheless, it can be understood that each engine may present a power margin that is left unused in terms of aircraft performance.

Furthermore, certain certification regulations may require means for verifying that each engine is capable of delivering the power that enables the aircraft to reach the certified performance levels.

Consequently, it is possible to perform a health check on engines. The procedure for checking the health of aircraft engines serves to measure the operating margins of the engines for a given monitoring parameter.

For example, two monitoring parameters may be used to check the performances of an engine.

Since a turbine engine has a high-pressure turbine arranged upstream from a free turbine, a first monitoring parameter is the temperature of the gas at the inlet of the high-pressure turbine, known as TET by the person skilled in the art.

Nevertheless, since the temperature TET is difficult to measure because of its high value, it is preferable for the first monitoring parameter to be the temperature of the gas at the inlet of the free turbine, known as T45 by the person skilled in the art. This temperature is a good image of the temperature TET, and consequently it is representative of the degradation of the engine.

A first monitoring parameter is thus the temperature of a turbine assembly, this temperature possibly being the temperature TET of the gas at the inlet of the high-pressure turbine or the temperature T45 of the gas at the inlet of the free turbine.

Furthermore, another monitoring parameter relates to the power delivered by the engine or to the torque from its shaft, where power and shaft torque are mutually dependent. Nevertheless, the speed of rotation of the gas generator of the engine, known as Ng by the person skilled in the art, is also linked with the power delivered by the engine, so a second monitoring parameter that can be used is this speed of rotation Ng of the gas generator.

Consequently, checking the health state of the engine may consist, for example, in:

measuring the first monitoring parameter and then verifying that the current power value is greater than or equal to the power value that an aging engine would deliver under the same conditions; or measuring the second monitoring parameter and then verifying that the current power value is greater than or equal to the power value that would be delivered by an aging engine under the same conditions.

By comparing the current value of a monitoring parameter with the minimum value that the monitoring parameter would have on an aging engine, the manufacturer can estimate the power margin of the engine.

It should be observed that it is also possible to measure information relating to the power developed by the engine for a given value of the first or the second monitoring parameter.

For example, on a rotary wing aircraft, measurements are taken of the torque developed by the engine and of the rotary speed Nr of the rotary wing. The power developed by the engine being monitored is then deduced therefrom in conventional manner.

Reference may be made to the literature in order to obtain information about the various procedures for checking the health of an engine.

Consequently, a manufacturer conventionally installs at least one overdimensioned engine on an aircraft in order to guarantee the performance levels of the aircraft between two overhauls. Furthermore, the manufacturer puts procedures into place for checking the health of the engine in order to verify that each engine can indeed develop power levels that enable it to ensure said performance levels.

This conservative approach is advantageous insofar as the performance of the aircraft is guaranteed. Nevertheless, during its lifetime, the aircraft may have available a margin of power of which no use is made in terms of performance.

In another approach, the maximum take-off weight of the aircraft is determined as a function of the power margin as determined during a health check of each of the engines of an aircraft. The maximum take-off weight is not set permanently by the manufacturer, but varies as a function of the results of health checks.

In a known implementation, this maximum take-off weight may vary in steps of 2% of a power margin, with the power margin being obtained as a result of a health check.

Determining the maximum take-off weight of an aircraft as a function of the available power margin is advantageous. Nevertheless, it is appropriate to check the health of the engines frequently.

Furthermore, a user may have difficulty in evaluating the utilization duration of an aircraft for a given maximum take-off weight, given that the maximum take-off weight is going to vary as a function of the wear of the engines.

The following documents are also known: FR 2 902 407; FR 2 899 640; U.S. Pat. No. 7,487,029; U.S. Pat. No. 8,068,997; and EP 1 741 901.

BRIEF SUMMARY OF THE INVENTION

An object of the present invention is thus to propose a method that enables the performance of a vehicle to be optimized as a function of the health of a turbine engine, in order to optimize the available power margin for each engine of the aircraft.

According to the invention, a method of optimizing the performance of an aircraft having a rotary wing driven by a power plant comprising at least one turbine engine, each turbine engine having a gas generator and a turbine assembly comprising at least one turbine, is remarkable in particular for the following steps:

during a definition step, the manufacturer defining a minimum first performance level of the aircraft and a maximum second performance level of the aircraft; and during a health check step, performing at least one health check of each engine by:

determining a current power delivered by each engine;

measuring a current speed of rotation Ng of the gas generator and a current gas temperature TET, T45 of said turbine assembly, i.e. either the temperature TET of the gas at the inlet of a high-pressure turbine or the temperature T45 of the gas at the inlet of a free turbine following on from the high-pressure turbine;

determining a first power margin between said first current power and a first minimum power defined by the manufacturer for guaranteeing said first performance level at said current speed of rotation Ng; and determining a second power margin between said current power and a second minimum power defined by the manufacturer for guaranteeing said first performance level at said current temperature TET, T45; and during an evaluation step, comparing each power margin with a first threshold, a target performance level being the second performance level when the first and second power margins of each engine are respectively greater than or equal to a first high threshold and a second high threshold, said target performance level being the first performance level when the first power margin of an engine is less than the first high threshold and/or when the second power margin of an engine is less than the second high threshold; and displaying the target performance level, with the aircraft being piloted in flight in compliance with the target performance level established before the flight.

Consequently, a manufacturer defines two performance levels for the aircraft.

The first performance level corresponds to the conventional performance level used in the state of the art. This first performance level may be reached by using the minimum power levels guaranteed by the engines.

In contrast, the second performance level seeks to make use of the power margins of the aircraft's engines.

In order to select which performance level can be used, a step of checking the health of the engines is performed.

This health check serves to determine the current power developed by the engine. For example, it is possible to measure the torque developed by each engine and the rotary speed Nr of the rotary wing of the aircraft with the help of the usual sensors. The current power is then deduced therefrom in conventional manner. Any method of determining the power developed by an engine can be used.

Furthermore, during the health check, a current speed of rotation Ng of the gas generator of each engine is measured together with a current temperature TET, T45 of said turbine assembly of each engine.

Under such circumstances, and with the help of charts defined by the manufacturer and stored in memory, a first minimum power is determined for each engine that corresponds to its speed of rotation Ng. In other words, the minimum power is determined that the engine must be capable of delivering when its speed of rotation Ng is equal to the measured current speed of rotation Ng.

A first power margin between the current power and the first minimum power is deduced therefrom.

In addition, with the help of charts defined by the manufacturer and stored in memory, a second minimum power is determined for each engine corresponding to its current temperature TET, T45. In other words, the minimum power is determined that the engine must be capable of delivering when its temperature is equal to the measured current temperature TET, T45.

The health check then makes it possible to determine a second power margin between the current power and the second minimum power, by taking into consideration the temperature TET of the gas at the inlet of the high-pressure turbine of said turbine assembly or the temperature T45 of the gas at the inlet of a free turbine following after the high-pressure turbine.

It is advantageous to take both of these monitoring parameters of the engines into consideration. It is found that the first power margin and the second power margin vary differently over time. When the power margins are degraded as a result of natural wear of an engine, the second power margin tends to decrease more quickly than the first power margin.

Following this health check step, a step of evaluating performance is implemented.

If each of the power margins is greater than or equal to the associated high threshold, then the power plant is capable of guaranteeing operation of the aircraft at the second performance level. If the engine presents power margins, it is then possible to make use of those power margins in order to maximize the performance of the aircraft.

In contrast, if a power margin is below the associated high threshold, then the power plant is no longer capable of guaranteeing this second performance level.

Under such circumstances, the target performance level that is to be complied with is either the first performance level or the second performance level depending on the results of the evaluation.

The high threshold may possibly be defined as a function of the utilization duration of the target second performance level and of the power margins available on a new engine.

It is observed that during average natural wear, the power margins decrease as a function of the utilization duration in a manner that can be predicted, with this applying in particular to the second power margin. It can be understood that the high threshold can be deduced from knowledge of the power margin of a new engine and of a target utilization duration for the second performance level.

After the evaluation step, the target performance level is displayed and the aircraft is piloted in flight in application of the target performance level established before the flight.

The characteristics of each performance level may be written in the flight manual, or they may be programmed in an on-board memory and displayed on a signaling device.

It can be understood that the high threshold may also take the maximum flight duration of a flight into consideration. Thus, if the changeover from the second performance level to the first performance level occurs during a flight, it should still be possible to finish the flight under the conditions of the initial second performance level.

This method thus makes it possible to act on a physical entity, namely the aircraft, by allowing the aircraft to be piloted in compliance with a precise performance level.

The method may also include one or more of the following characteristics.

For example, each performance level may include at least one performance aspect to be selected from a list comprising at least one of the following performance aspects: a maximum take-off weight of the aircraft; and a cruising speed.

The method thus presents the advantage of optimizing the maximum take-off weight of the aircraft and/or a cruising speed of the aircraft if the engines offer a power margin in excess of a guaranteed minimum power.

It is also possible to display each power margin. A user can then make use of curves pre-established by the manufacturer to estimate easily the utilization time that remains for the second performance level during natural wear.

In another aspect, the method may require a low threshold to be taken into account.

Each engine needs to be subjected to an overhaul operation once its TBO of flight hours has been reached.

Nevertheless, it is possible to request an overhaul of an engine when at least one power margin of the engine is below a low threshold. Optionally, each low threshold may have a value of zero. Thus, if the power margin of an engine becomes negative, then the second performance level is no longer guaranteed.

In order to remedy anticipated degradation occurring before the number of flight hours TBO, it is thus possible to compare each power margin with a low threshold.

In this variant, during the evaluation step:
the manufacturer guarantees a second performance level when each power margin is greater than or equal to a high threshold;
the manufacturer guarantees a first performance level when at least one power margin lies between a high threshold and a low threshold and each power margin is greater than said low threshold; and
the manufacturer requires the engine to be overhauled when a power margin of the engine is below a low threshold.

In a first implementation, it is possible to perform the health check step at a frequency defined by the manufacturer, for example possibly at a frequency of once every 25 hours (h).

If the target performance level is the second performance level, this second performance level is thus usable for at least a duration that corresponds to said frequency.

The user may obtain a broad estimate of the remaining utilization time by making use of power margins, and an estimate that guarantees performance in the short term by implementing the first implementation.

It is possible to envisage displaying the time remaining before a new health check step, e.g. by means of a time counter.

In a second implementation, the health check step may be performed automatically in flight.

In a variant of this implementation, the following steps are performed:
measuring and storing in flight data relating to the speed of rotation Ng of the gas generator of each engine, the temperature of the gas in said turbine assembly having at least one turbine, the torque developed by each engine, and a rotary speed Nr of a rotary wing of the aircraft, the torque being proportional to the power developed by the engine;
acting at a given frequency to evaluate the stability of said stored data;
determining a mean value for each data item; and
performing the health check step and then the evaluation step with the help of said mean values once said data is stable.

During a flight, data relating to each engine is thus stored in storage means.

The stability of the data is then analyzed. For example, it is possible to use a known method that consists in determining a maximum, a minimum, and a standard deviation. If the standard deviation is small, it is thus deduced that the data is stable.

A mean value is then determined for each data item in order to perform the health check step.

If the mean values are stable, then the first power margin and the second power margin are determined on the basis of these mean values.

Thus, measurements are taken of the torque developed by each engine and the rotary speed Nr of the rotary wing of the aircraft at constant speed Ng of the gas generator of said engine. Torque may be measured with the help of a torque meter placed on a drive shaft driven by the free turbine.

The current power is then deduced therefrom.

By using the mean value of the speed of rotation Ng of the gas generator, the first power margin is deduced therefrom.

Furthermore, by using the mean value of the temperature of the gas in said turbine assembly having at least one turbine, the second current power and the second power margin are deduced therefrom.

In an alternative variant, measurement flight stages are defined during which the health check step may be performed, and the health check step is performed when the aircraft is operating in one of the measurement flight stages.

By using appropriate equipment on board the aircraft, it is possible to identify the current state of flight, e.g. a stage of cruising flight. If the current stage of flight corresponds to a measurement flight stage as defined by the manufacturer, then the health check step is performed automatically, followed by the evaluation step.

During a health check step, it is possible to perform a plurality of health checks on an engine, automatically or at the request of a pilot.

Consequently, and in a variant, the evaluation step is performed by using the mean of the power margins that result from said health checks. In addition, and using conventional methods, it is possible to envisage ignoring results that constitute outliers.

A mean, possibly associated with eliminating outlier points, makes it possible to obtain an optimized image of the power margins as determined.

In another aspect, it is possible to normalize the power margins with the help of a first health indicator relating to the first power margin and of a second health indicator relating to said second power margin, each indicator having a maximum value when the engines are received, an intermediate value representing the high threshold, and a minimum value representing a low threshold.

Power margins vary from one engine to another because of dispersions during engine manufacture. In order to avoid having large dispersion of such power margins, these margins are normalized by using the health indicator.

During the evaluation step, each power margin is then compared with at least one threshold by making use of its health indicator.

In addition to a method, the invention also provides an optimization device making use of the method. The optimization device comprises in particular:

one "engine computer" per engine in a power plant for implementing a step of checking the health of the associated engine;

an "avionics computer" for implementing an evaluation step in order to determine a target performance level; and a signaling device for signaling said target performance level.

The optimization device may possibly include means for determining the current stage of flight of the aircraft.

The invention also provides an aircraft including the optimization device.

BRIEF DESCRIPTION OF THE SEVERAL VIEWS OF THE DRAWINGS

The invention and its advantages appear in greater detail from the context of the following description of embodiments given by way of illustration and with reference to the accompanying figures, in which.

DETAILED DESCRIPTION OF THE INVENTION

Figure 1:
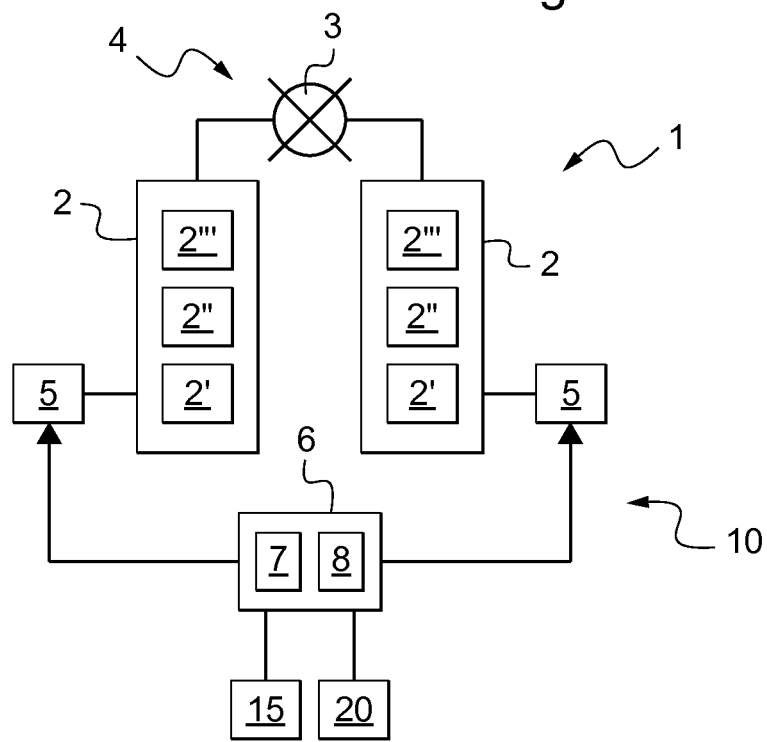
FIG. 1 is a diagram of an aircraft of the invention.

FIG. 1 shows an aircraft 1 with a rotary wing 4. The rotary wing 4 is set into rotation by a power plant acting via a main power gearbox (MGB) 3.

This power plant includes at least one turbine engine 2. More precisely, the aircraft 1 shown has two turbine engines 2.

Each turbine engine 2 may be a turboshaft engine, comprising in particular a gas generator 2', and a turbine assembly comprising at least one turbine. By way of example, the assembly comprises a high-pressure turbine 2" and a free turbine 2'''.

Certain aspects of the performance of the aircraft may depend in particular on the power levels developed by the turbine engines 2. These aspects include in particular the maximum take-off weight of the aircraft 1 or indeed the cruising speed of the aircraft 1.

In order to optimize its performance, the aircraft 1 includes an optimization device 10.

The device 10 comprises one engine computer 5 per turbine engine 2, such as a computer known under the acronym FADEC for "full authority digital engine control".

Furthermore, the device 10 has an avionics computer 6 co-operating with each engine computer 5 in order to determine a target performance level that is to be satisfied in accordance with the method of the invention.

The device 10 also has sensors (not shown) for performing the required measurements.

To apply the method, the avionics computer may comprise calculation means 7 and storage means 8. Furthermore, the avionics computer may communicate via wired or wireless connections with an information signaling device 20 and with means 15 for determining the current flight stage of the aircraft.

Figure 2:
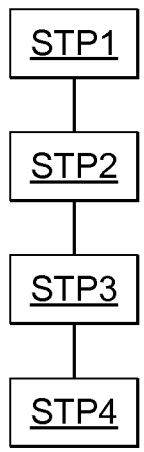
FIG. 2 is a diagram showing the method implemented.
Elements present in more than one of the figures are given the same references in each of them.

FIG. 2 is a diagram for explaining the method.

During a definition step STP1, the manufacturer defines first and second aircraft performance levels.

For example, each performance level defines a maximum take-off weight of the aircraft and a cruising speed of the aircraft.

The first performance level LEND may correspond to a minimum performance level. This first performance level LEND may thus correspond to the performance level guaranteed on a conventional aircraft that presents performance levels that are constant.

In contrast, the second performance level HEND seeks to take advantage of the power margins of the engines relative to the powers they generate at the first performance level LEND.

The second performance level HEND thus makes it possible to reach a maximum take-off weight and/or a cruising speed that is/are greater than the maximum take-off weight and/or the cruising speed associated with the first performance level LEND.

The method thus establishes two distinct performance levels, and not only a single performance level possibly having variable characteristics.

In a health check step STP2, at least one health check is performed on the engines 2.

Each engine computer 5 then proceeds to check health by:
determining a current power delivered by each engine with the help of appropriate sensors;
measuring the current speed of rotation Ng of the gas generator 2' of the turbine engine 2; and
determining a first power margin between the current power and a first minimum power, the first minimum power being defined by the manufacturer for guaranteeing the first performance level when the speed of rotation Ng of the gas generator 2' is equal to the measured current speed of rotation Ng.

It can be understood that the engine computer includes a memory that provides the first minimum power as a function of the measured current speed of rotation Ng.

For example, the torque developed by each engine and the rotary speed Nr of the rotary wing of the aircraft for constant speed Ng of the gas generator of said engine are measured with the help of the usual sensors.

Thereafter, the current power and the first power margin are deduced in conventional manner. The current power is equal to the product of the rotary speed Nr multiplied by said torque, possibly multiplied by a gearing ratio. This gearing ratio is defined by the manufacturer and gives said rotary speed of the rotary wing as a function of the speed of rotation of the engine shaft on which said torque is measured.

It is also possible to measure the torque delivered by another outlet shaft of each engine as driven by a free turbine, and also the speed of rotation of this outlet shaft using conventional sensors.

The current power and the first power margin are then deduced in conventional manner therefrom. The current power is equal to the product of the speed of rotation of the outlet shaft multiplied by said torque.

Furthermore, each engine computer 5 then proceeds with a health check by:

measuring a gas temperature in said turbine assembly comprising at least one turbine with the help of appropriate sensors, i.e. a temperature TET of the gas at the inlet of each high-pressure turbine 2", or a temperature T45 of the gas at the inlet of a free turbine 2''' following on from the high-pressure turbine 2"; and determining a second power margin between said current power and a second minimum power, the second minimum power being defined by the manufacturer to guarantee said first performance level when the monitored gas temperature is equal to the current temperature.

It can be understood that the engine computer has a memory providing the second minimum power as a function of the measured current temperature.

It is possible to implement known techniques for performing these checks.

During an evaluation step STP3, the avionics computer 6 uses the determined first and second power margins.

The avionics computer then compares each power margin with a high threshold.

Thus, the avionics computer performs instructions stored in its storage means for determining whether the first power margin is greater than or equal to a first high threshold SH1 and whether the second power margin is greater than or equal to a second high threshold SH2, and it does so for each of the engines of the aircraft.

If the margins are greater than or equal to their high thresholds, it is possible to reach the performance of the second performance level HEND. The target performance level to be complied with is thus the second performance level HEND.

Otherwise, i.e. if at least one power margin is less than the associated high threshold, it is not possible to reach the performance of the second performance level HEND. The target performance level to be complied with is thus the first performance level LEND.

In a signaling step STP4, information is displayed relating to the target performance level.

For example, the signaling device 20 displays the term "HIGH END" when the target performance level is the second performance level HEND, and the term "LOW END" when the target performance level is the first performance level LEND.

A pilot may consult a flight manual giving the details of the performance level that is to be applied in order to pilot the aircraft during a flight in compliance with the target performance level established before the flight.

In alternative manner, or in addition, the avionics computer may display details of the performance level to be applied.

It is also possible in particular to display each power margin that results from the health check.

Furthermore, the avionics computer can also take a low margin into consideration for each power margin, the low margin being lower than the high margin.

Thus, if the first power margin or the second power margin of an engine is less than the low threshold, then the avionics computer can request an overhaul.

For example, the avionics computer can display an overhaul order on the signaling device 20.

In another aspect, during the health check step STP2, each engine computer 5 does not perform one health check but rather a plurality of health checks.

During the evaluation step STP3, the avionics computer 6 can execute stored instructions to obtain a moving average of the results of the various health checks.

Under such circumstances, the avionics computer calculates a first power margin from a moving average of the first power margins that have been determined, and a second power margin from a moving average of the second power margins that have been determined. The avionics computer then compares each power margin that results from a moving average with a high threshold, or with a low threshold, as appropriate.

In another aspect, in order to smooth the power dispersions observed on a new engine, it is possible to normalize the power margins with the help of a first health indicator IND1 relating to the first power margin and with the help of a second health indicator IND2 relating to a second power margin.

The health indicator of the engine then corresponds to the smaller of the first and second health indicators IND1 and IND2.

Each health indicator possesses a maximum value when the engines are received, an intermediate value representing the high threshold, and a minimum value representing a low threshold, as appropriate.

The maximum, intermediate, and minimum values may be 10, 5, and 0, respectively.

To illustrate the operation of this variant, at a given instant, the first power margin may be 7.5% and may correspond to a first health indicator of 9.1, while the second power margin may be 5.5% and correspond to a second health indicator of 9.3.

The overall health indicator of the engine is then 9.1. In addition, each power margin is greater than the high threshold corresponding to a power margin of 5, which implies that the second performance level HEND can be achieved.

Under such circumstances, it is possible to compare each power margin with the associated threshold by comparing the overall health indicator of the engine with a threshold.

In a first implementation, the health check step STP2 is performed at a frequency that is defined by the manufacturer. For example, this frequency may be of the order of once every 25 hours.

Every 25 hours, a pilot thus performs a flight under the conditions required for each engine computer 5 to perform at least one health check.

It is possible to envisage displaying the time remaining before a new health check step.

In a second implementation that is less constraining, the health check step is performed automatically in flight.

It can be understood that it is possible to make use of both implementations on a given aircraft. A pilot may then decide to request a health check manually or to allow such a check to be performed automatically.

In a variant of the second implementation, the following steps are performed:

measuring and storing in flight data relating to the speed of rotation Ng of the gas generator of each engine, the gas temperature TET, T45 in said turbine assembly comprising at least one turbine in each engine, and the torque developed by each engine, and also the rotary speed Nr of the rotary wing;

acting at a given frequency to evaluate the stability of the stored data;

determining a mean value for each data item; and performing the health check step and then the evaluation step with the help of said mean values once said data is stable.

For example, each engine computer measures the data relating to the speed of rotation Ng of the gas generator of each engine, the temperature TET of the gas at the inlet of the high-pressure turbine of each engine, and the torque developed by the corresponding engine.

Each engine computer continuously sends this data to the avionics computer which stores it. Data storage may be temporary in order to limit the volume of the storage means.

The avionics computer determines whether the transmitted data is stable in application of stability criteria as defined by the manufacturer.

If a data set presents the required stability criteria, then the avionics computer sends a request to each engine computer requesting it to perform at least one health check.

Each engine computer can determine a mean value for each data item based on the samples judged to be stable by the avionics computer. By using the determined mean values, each engine computer deduces therefrom the first power margin and the second power margin.

Each engine computer transmits the first power margin and the second power margin that results from the health check to the avionics computer.

The avionics computer can display the first power margin and the second power margin and/or can implement the evaluation step.

In a second variant, the manufacturer defines measurement flight stages during which the health check step STP2 can be performed.

When the determination means 15 enable the avionics computer to detect that the aircraft is operating in one of said measurement flight stages, the avionics computer sends a request to each engine computer requesting it to perform at least one health check.

Naturally, the present invention may be subjected to numerous variations as to its implementation. Although several implementations are described above, it will readily be understood that it is not conceivable to identify exhaustively all possible implementations. It is naturally possible to envisage replacing any of the means described by equivalent means without going beyond the ambit of the present invention.

What is claimed is:

1. A method of optimizing the performance of an aircraft having a rotary wing driven by a power plant comprising at least one turbine engine, each turbine engine having a gas generator and a turbine assembly comprising at least one turbine, the method comprising:

during a definition step (STP1), the manufacturer defining a minimum first performance level (LEND) of the aircraft and a maximum second performance level (HEND) of the aircraft; and during a health check step (STP2), performing at least one health check of each turbine engine by:

determining a current power delivered by each turbine engine;

measuring a current speed of rotation (Ng) and a current temperature (TET, T45) of the gas at said turbine assembly;

determining a first power margin between said current power and a first minimum power defined by the manufacturer for guaranteeing said first performance level at said current speed of rotation (Ng); and determining a second power margin between said current power and a second minimum power defined by the manufacturer for guaranteeing said first performance level at said current temperature (TET, T45); and during an evaluation step (STP3), comparing each power margin with a first threshold (SH1, SH2), a target performance level being the second performance level when the first and second power margins of each engine are respectively greater than or equal to a first high threshold (SH1) and a second high threshold (SH2), said target performance level being the first performance level when the first power margin of an engine is less than the first high threshold and/or when the second power margin of an engine is less than the second high threshold; and displaying the target performance level, with the aircraft being piloted in flight in compliance with the target performance level established before the flight.

2. A method according to claim 1, wherein overhaul of a turbine engine is required when at least one power margin of the engine is less than a low threshold (SB1, SB2).

3. A method according to claim 1, wherein each performance level includes at least one performance aspect to be selected from a list comprising at least one of the following performance aspects: a maximum take-off weight of the aircraft; and a cruising speed of the aircraft.

4. A method according to claim 1, wherein the health check step (STP2) is performed at a frequency defined by the manufacturer.

5. A method according to claim 4, wherein the time remaining before a new health check step is displayed.

6. A method according to claim 1, wherein the health check step is performed automatically in flight.

7. A method according to claim 1, characterized by the following steps:

measuring and storing in flight data relating to the speed of rotation (Ng) of the gas generator of each engine, the temperature (TET, T45) of the gas in said turbine set of each engine together with the torque developed by each engine, and a rotary speed (Nr) of said rotary wing;

acting at a given frequency to evaluate the stability of said stored data;

determining a mean value for each data item; and performing the health check step and then the evaluation step with the help of said mean values once said data is stable.

8. A method according to claim 1, wherein measurement flight stages are defined during which the health check step may be performed, and the health check step is performed when the aircraft is operating in one of said measurement flight stages.

9. A method according to claim 1, wherein a plurality of engine health checks are performed and said evaluation step is performed by using a moving average of the power margins that result from said health checks.

10. A method according to claim 1, wherein said power margins are normalized with the help of a first health indicator (IND1) relating to said first margin and with the help of a second health indicator (IND2) relating to said second margin, each health indicator having a maximum value when the engines are received, an intermediate value representing the high threshold, and a minimum value representing a low threshold.

11. A method according to claim 1, wherein each power margin is displayed.

12. A method according to claim 1, wherein said temperature (TET, T45) of the gas in said turbine assembly is either the temperature (TET) of the gas at the inlet of a high-pressure turbine, or the temperature (T45) of the gas at the inlet of a free turbine following on from the high-pressure turbine.

13. An optimization device implementing the method according to claim 1, wherein the device comprises:
   one engine computer per turbine engine in a power plant for implementing a step (STP2) of checking the health of the associated turbine engine;
   an avionics computer for implementing an evaluation step (STP3) in order to determine a target performance level; and
   signaling means for signaling said target performance level.

14. An aircraft, including an optimization device according to claim 13.

* * * * *